United States Patent
Chang

(10) Patent No.: US 8,009,281 B2
(45) Date of Patent: Aug. 30, 2011

(54) LENS MODULE DISTORTION MEASURING SYSTEM AND METHOD

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 164 days.

(21) Appl. No.: 12/555,878

(22) Filed: Sep. 9, 2009

(65) Prior Publication Data
US 2010/0060882 A1    Mar. 11, 2010

(30) Foreign Application Priority Data
Sep. 10, 2008    (CN) .......................... 2008 1 0304453

(51) Int. Cl.
*G01B 9/00*    (2006.01)

(52) U.S. Cl. ....................... 356/124; 356/127

(58) Field of Classification Search .......... 356/124–128, 356/154; 359/662, 642; 250/559.07–559.08, 250/559.01
See application file for complete search history.

(56) References Cited

U.S. PATENT DOCUMENTS

| | | | |
|---|---|---|---|
| 6,195,159 B1* | 2/2001 | MacDonald et al. | ......... 356/123 |
| 2007/0070530 A1* | 3/2007 | Seo et al. | ...................... 359/819 |

* cited by examiner

*Primary Examiner* — Tri T Ton
(74) *Attorney, Agent, or Firm* — Altis Law Group, Inc.

(57) ABSTRACT

A lens module distortion measuring system configured to measure the distortion of a lens module including: a light source configured to emit light rays; a diffusing panel configured to diffuse the light rays; a substantially opaque shielding plate beneath the diffusing panel, the shielding plate defining a regular matrix of light-passing holes capable of allowing some of the diffused light rays to pass therethrough; an image capturing device configured to capture a image of the shielding plate as viewed through the lens module, the image comprising an array of light spots corresponding to the light-passing holes; and a computing unit electrically connected to the image capturing device and configured to analyze the light spots of the image and thereby determine the distortion of the lens module.

12 Claims, 4 Drawing Sheets

LENS MODULE DISTORTION MEASURING SYSTEM AND METHOD

BACKGROUND

1. Technical Field

The present disclosure relates to a lens module distortion measuring system and method.

2. Description of Related Art

In the manufacture of lens modules, distortion measuring is carried out to determine the quality of each lens module. Typically, distortion measuring is carried out by capturing an image using the lens module under test, and comparing the captured image with a standard image to determine if the distortion of the lens module is acceptable. This procedure is not very convenient and is subject to inaccuracy.

Therefore, a lens module distortion measuring system and method to overcome the above-described problems are desired.

DETAILED DESCRIPTION

Embodiments of the lens module distortion measuring system and method will now be described in detail with reference to the drawings.

Figure 1:
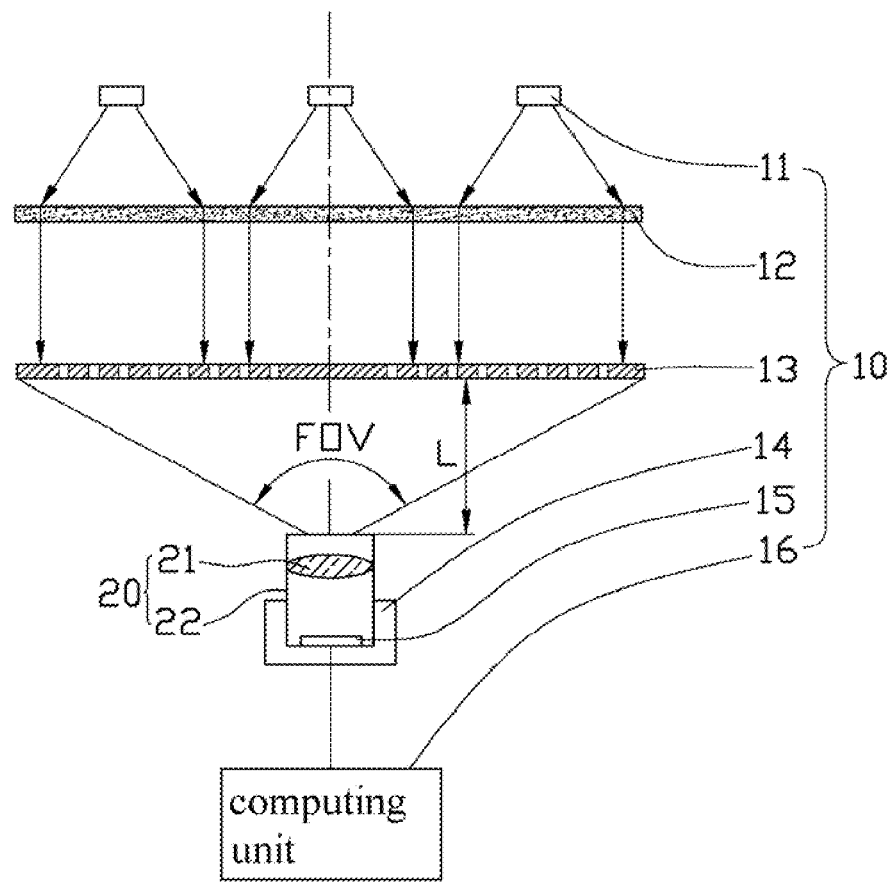
FIG. 1 is essentially a schematic, side plan view of a lens module distortion measuring system according to the present disclosure, together with a lens module.

Referring to FIG. 1, a lens module distortion measuring system 10 is used for measuring the distortion of a lens module 20. The lens module distortion measuring system 10 includes at least one light source 11, a diffusing panel 12, a shielding plate 13, a supporting board 14, an image capturing device 15, and a computing unit 16.

In this embodiment, there are three light sources 11, which are aligned coplanarly with one another and spaced a same distance above the diffusing panel 12. Each light source 11 is configured to emit light rays to the diffusing panel 12. In the present embodiment, each light source 11 is a light-emitting diode (LED). In other embodiments, there may be only a single light source 11.

The diffusing panel 12 is a rectangular plate that diffuses the light rays from the light sources 11.

Figure 2:
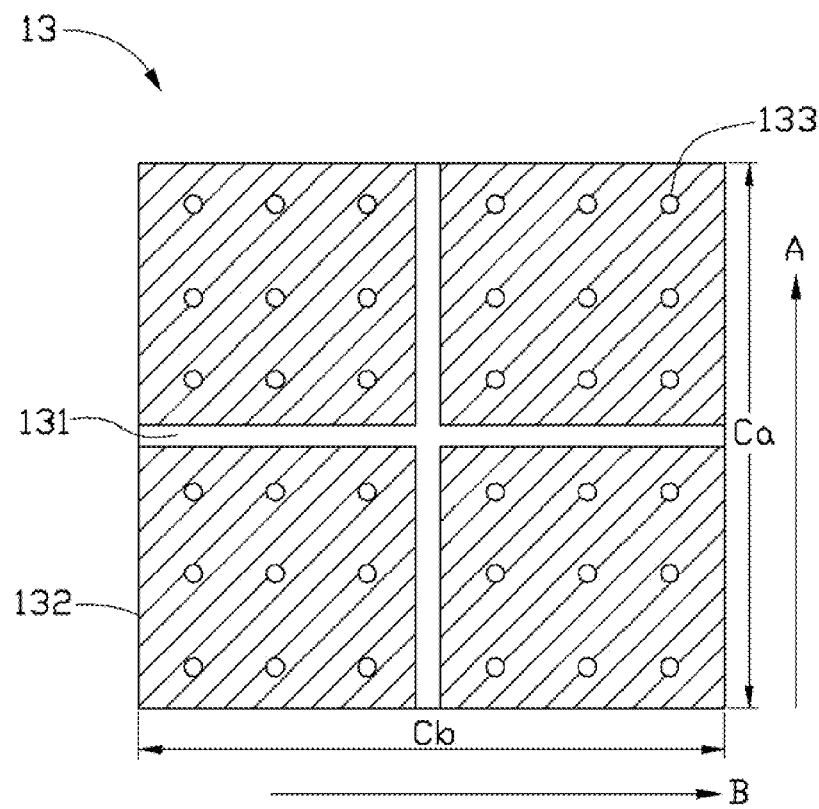
FIG. 2 is a schematic, top plan view of a shielding plate of the lens module distortion measuring system of FIG. 1.

Also referring to FIG. 2, the shielding plate 13 is substantially opaque, and can have a thickness approximately 5 mm. The shielding plate 13 is positioned under the diffuser plate 12; i.e., at a side of the diffuser plate 12 opposite from the side of the diffuser plate 12 facing the light sources 11. The shielding plate 13 has a shape similar to that of the diffusing panel 12. The shielding plate 13 includes a transparent cross-shaped area 131. The transparent cross-shaped area 131 is centered at the center of the shielding plate 13, and partitions the shielding plate 13 into four opaque areas 132. In the present embodiment, the opaque areas 132 all have the same size. The opaque areas 132 define a number of light-passing holes 133, which can for example be through holes. The light-passing holes 133 are circular, and are arrayed in the shielding plate 13 in a regular m×n matrix. A diameter of the light-passing holes 133 can for example be 3 mm. A pitch between adjacent light holes 133 along a direction A (as shown in FIG. 2) is uniform, and a pitch between adjacent light holes 133 along a direction B (as shown in FIG. 2) is uniform. The direction A and the direction B perpendicularly intersect each other. The direction A is parallel to one of the arms of the transparent orthogonal area 131, and the direction B is parallel to the other arm of the transparent orthogonal area 131. In the present embodiment, the pitch along the direction A is the same as the pitch along the direction B. The pitch can for example be 5 cm.

The supporting board 14 is positioned beneath the shielding plate 13. The supporting board 14 is configured to support the image capturing device 15 and the lens module 20.

The image capturing device 15 is disposed on the supporting board 14. The image capturing device 15 is configured to capture an image of the shielding plate 13 as visible through the lens module 20. The image capturing device 15 can be a charge coupled device (CCD) or a complementary metal oxide semiconductor (CMOS).

The computing unit 16 is electrically connected to the image capturing device 15. The computing unit 16 is configured to analyze the image of the shielding plate 13 captured by the image capturing device 15, and compute the distortion of the lens module 20.

The lens module 20 includes at least one lens 21, and a barrel 22 receiving the at least one lens 21. In the present embodiment, there is only a single lens 21. The lens 21 focuses light rays on the image capturing device 15.

In use of the lens module distortion measuring system 10, the lens module 20 is placed on the supporting board 14 and is optically coupled to the image capturing device 15. The center of the transparent cross-shaped area 131 is aligned with an optical axis of the lens module 20. The vertical distance L between the shielding plate 13 and the lens module 20 satisfies the formulas:

$$C_a \geq 2*L*\tan(FOV/2), \text{ and}$$

$$C_b \geq 2*L*\tan(FOV/2),$$

wherein $C_a$ is the side length of the shielding plate 13 along the direction A, $C_b$ is the side length of the shielding plate 13 along the direction B, and FOV is the field of view of the lens module 20. As seen in FIG. 1, in this embodiment, the size of the shielding plate 13 generally corresponds to the field of view of the lens module 20, and the size of the diffuser plate 12 corresponds to the size of the shielding plate 13. In a typical example, the field of view of the lens module 20 may be 100°, and L may be in the range from 25 cm to 60 cm.

Next, the light sources 11 are powered on. The light rays from the light sources 11 enter the diffusing panel 12, and exit the diffusing panel 12 as diffused light rays. The diffused light transmits from the diffusing panel 12 to the shielding plate 13. Most of the diffused light is blocked by the opaque areas 132 of the shielding plate 13, while part of the diffused light passes through the light-passing holes 133 of the shielding plate 13. The light passed through the shielding plate 13 transmits to and through the lens module 20. The image capturing device 15 captures the light transmitted from the lens module 20, and forms an image of the shielding plate 13.

Figure 3:
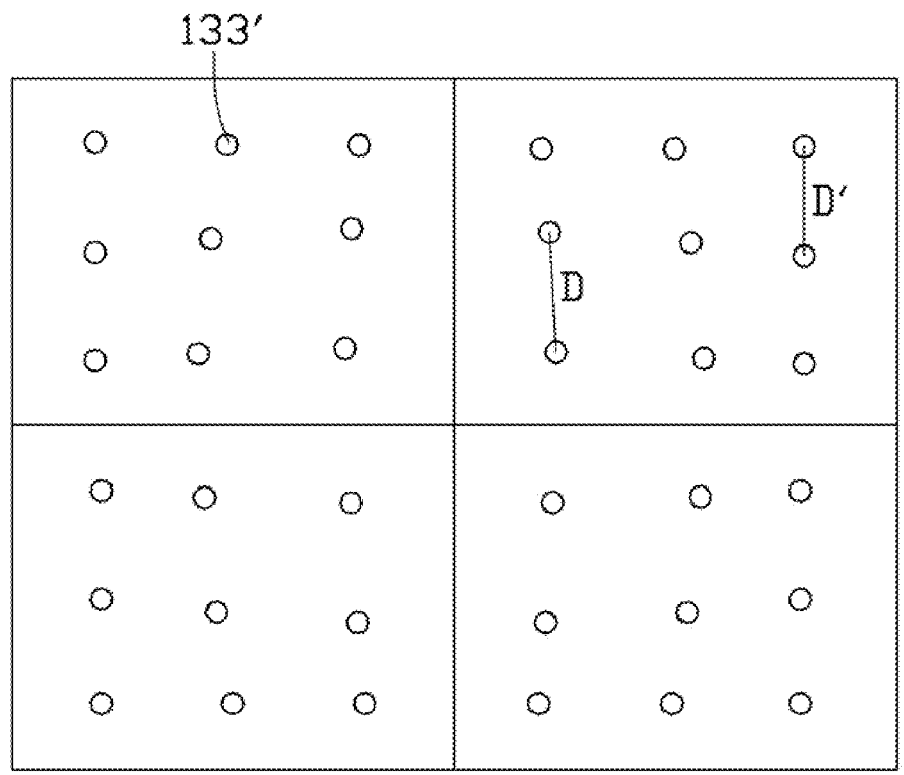
FIG. 3 is a diagram of an image captured by the lens module distortion measuring system of FIG. 1, showing a principle of computing distortion of the lens module under test.

Further referring to FIG. 3, the image captured by the image capturing device 15 includes a number of light spots 133' corresponding to the light holes 133. The computing unit 14 analyzes the light spots 133', and determines the center of each of the light spots 133'. Then the computing unit 16 calculates a first average distance D between adjacent light spots 133' in a central portion of the image, and a second average distance D' between adjacent light spots 133' in a peripheral portion of the image. The central portion is the portion at or near the middle of the image. The peripheral portion is the portion adjacent to the edges of the image. The distortion of the lens module 20 is the ratio of the second average distance D' to the first average distance D.

Figure 4:
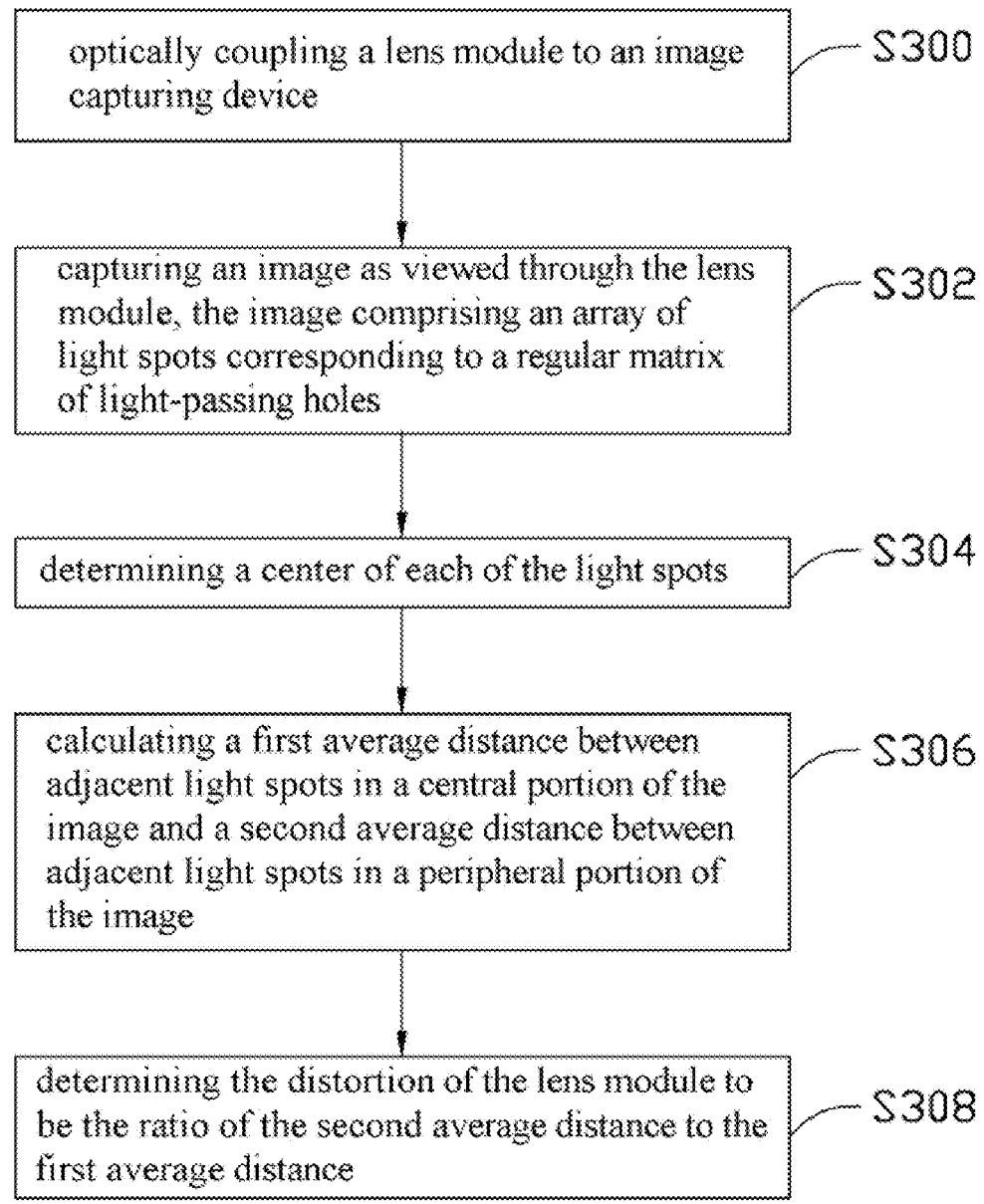
FIG. 4 is a flowchart of a lens module distortion measuring method, according to the present disclosure.

FIG. 4 shows a flowchart of an exemplary method for measuring the distortion of the lens module 20. The method can be exemplarily performed by utilizing the lens module distortion measuring system 10. In this embodiment, the method includes the following steps S300-S308:

In step S300, a lens module 20 is coupled to an image capturing device 15.

In step S302, an image including an array of light spots 133' as viewed through the lens module 20 is captured by the image capturing device 15, with the light spots 133' corresponding to the regular matrix of light-passing holes 133.

In step S304, a center of each of the light spots 133' is determined.

In step S306, a first average distance D between adjacent light spots 133' in a central portion of the image and a second average distance D' between adjacent light spots 133' in a peripheral portion of the image, are calculated.

In step S308, the distortion of the lens module 20 is the ratio of the second average distance D' to the first average distance D.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope and spirit of the invention.

What is claimed is:

1. A lens module distortion measuring system, comprising:
a light source configured to emit light rays;
a diffusing panel beneath the light source and configured to diffuse the light rays;
a substantially opaque shielding plate beneath the diffusing panel, the shielding plate defining a regular matrix of light-passing holes;
an image capturing device configured to capture an image of the shielding plate as viewed through the lens module, the image comprising an array of light spots corresponding to the light-passing holes; and
a computing unit electrically connected to the image capturing device and configured to analyze the light spots of the image and thereby determine the distortion of the lens module, wherein the computing unit calculates a first average distance between adjacent light spots in a central portion of the image, and a second average distance between adjacent light spots in a peripheral portion of the image, and the distortion of the lens module is the ratio of the second average distance to the first average distance.

2. A lens module distortion measuring method, comprising:
optically coupling a lens module to an image capturing device;
capturing an image as viewed through the lens module, the image comprising an array of light spots corresponding to a regular matrix of light-passing holes;
calculating a first average distance between adjacent light spots in a central portion of the image, and a second average distance between adjacent light spots in a peripheral portion of the image; and
determining the distortion of the lens module to be the ratio of the second average distance to the first average distance.

3. The lens module distortion measuring system in claim 1, wherein the central portion is the portion at or near the middle of the image, and the peripheral portion is the portion adjacent to edges of the image.

4. The lens module distortion measuring system in claim 1, wherein the light sources are aligned coplanarly with one another and spaced a same distance above the diffusing panel.

5. The lens module distortion measuring system in claim 1, wherein the shielding plate comprises a transparent cross-shaped area, the transparent cross-shaped area is centered at a center of the shielding plate and partitions the shielding plate into four opaque areas, and the light-passing holes are defined in the opaque areas.

6. The lens module distortion measuring system in claim 1, wherein the vertical distance L between the shielding plate and the lens module satisfies the formulas:

$$C_a \geq 2*L*\tan(FOV/2), \text{ and}$$

$$C_b \geq 2*L*\tan(FOV/2),$$

wherein $C_a$ is a side length of the shielding plate along a first direction, $C_b$ is a side length of the shielding plate along a second direction that is substantially perpendicular to the first direction, and FOV is the field of view of the lens module.

7. The lens module distortion measuring system in claim 1, further comprising a supporting board, wherein the supporting board is positioned beneath the shielding plate, and the image capturing device and the lens module are positioned on the supporting board.

8. The method in claim 2, further comprising providing at least one light source, wherein the shielding plate is illuminated with light emitted from the at least one light source.

9. The method in claim 2, further comprising determining a center of each of the light spots before calculating the first average distance and the second average distance.

10. The method in claim 2, further comprising providing a substantially opaque shielding plate, wherein the shielding plate defining a regular matrix of light-passing holes.

11. The method in claim 2, further comprising providing a diffusing panel, wherein the shielding plate is illuminated with light that has passed through the diffusing panel.

12. The method in claim 8, wherein the at least one light source is at least one light-emitting diode.

* * * * *